United States Patent [19]

Schön

[11] Patent Number: 4,517,137
[45] Date of Patent: May 14, 1985

[54] METHOD AND APPARATUS FOR IMPREGNATING POROUS ELECTRODES OR THE LIKE

[76] Inventor: Christian O. Schön, Römerstrasse 1, D-7590 Achern 18, Fed. Rep. of Germany

[21] Appl. No.: 557,403

[22] Filed: Nov. 30, 1983

Related U.S. Application Data

[63] Continuation of Ser. No. 323,884, Nov. 23, 1981, abandoned.

[30] Foreign Application Priority Data

Dec. 6, 1980 [DE]  Fed. Rep. of Germany ....... 3046171

[51] Int. Cl.³ .............................................. C01B 31/00
[52] U.S. Cl. .................................. 264/29.5; 264/29.7; 264/57; 264/102; 264/136
[58] Field of Search ........................ 264/29.5, 29.7, 57, 264/58, 101, 102, 136

[56] References Cited

U.S. PATENT DOCUMENTS

| | | | |
|---|---|---|---|
| 2,087,724 | 7/1937 | Sanders | 264/29.5 |
| 2,883,708 | 4/1959 | Sem | 264/29.5 |
| 4,087,011 | 5/1978 | Taniguchi | 214/152 |
| 4,098,428 | 7/1978 | Taniguchi | 220/319 |
| 4,100,314 | 7/1978 | Wallouch | 264/29.5 |
| 4,342,718 | 8/1982 | Caratsch | 264/136 |

FOREIGN PATENT DOCUMENTS

| | | |
|---|---|---|
| 568097 | 1/1933 | Fed. Rep. of Germany . |
| 1471246 | 12/1968 | Fed. Rep. of Germany . |
| 2716040 | 4/1977 | Fed. Rep. of Germany . |
| 2732553 | 1/1979 | Fed. Rep. of Germany . |
| 27454604 | 4/1979 | Fed. Rep. of Germany . |
| 996759 | 6/1965 | United Kingdom . |

Primary Examiner—Paul Lieberman
Assistant Examiner—Willie Thompson
Attorney, Agent, or Firm—Peter K. Kontler

[57] ABSTRACT

Carbon electrodes are impregnated with pitch during transport in mobile vessels which first travel to a heating station where the electrodes are heated in several stages by gases which are hotter from stage to stage. The vessels next travels to a station where the sealed vessels are connected with a suction pump to evacuate the fluid from their interiors and from the pores of the electrodes therein and where the vessels are substantially filled with pitch which is caused to penetrate into the empty pores. The vessels then travel to a station where the contents of the vessels are pressurized to ensure complete permeation of electrodes with pitch. The vessels subsequently travel an optional station where the electrodes in the vessels are baked to convert the pitch into coke, and to one or more cooling stations where the electrodes are heated by air, water and/or nitrogen. Fumes which develop during heating, evacuation of fluid from the pores, baking and cooling are filtered to avoid contamination of the surrounding area.

41 Claims, 8 Drawing Figures

METHOD AND APPARATUS FOR IMPREGNATING POROUS ELECTRODES OR THE LIKE

This application is a continuation of application Ser. No. 323,884, filed Nov. 23, 1981 now abandoned.

BACKGROUND OF THE INVENTION

The present invention relates to a method and apparatus for filling the pores of hollow solid bodies such as carbon or graphite electrodes (hereinafter called carbon electrodes), and more particularly to improvements in a method and apparatus which can be resorted to for the making of premium grade carbon electrodes which are impregnated with pitch, tar and/or other filler materials (hereinafter referred to as pitch).

The utilization of carbon electrodes for the purpose of melting steel in an electric furnace is gaining increasing popularity. One of the reasons for such increasing popularity is that a furnace utilizing carbon electrodes can be used for the processing of low-grade scrap. As a rule, electrodes of the type used in electric furnaces have a diameter of 300-800 mm and an axial length of 1500-3000 mm.

In accordance with a heretofore known procedure, carbon electrodes are produced by introducing effective amounts of ground coke and pitch into a suitable mold and by baking the contents of the mold at a temperature of approximately 1000° C. in the absence of oxygen. The vapors which develop during baking entail the formation of pores in the resulting electrode. Such porosity, which can amount to a substantial percentage of the volume of the electrode (under certain circumstances up to 20 percent by volume), is undesirable for a number of reasons. As a rule, the manufacturer attempts to produce high-density electrodes because the current-carrying capacity of such electrodes is much more satisfactory than that of highly porous electrodes. Furthermore, an electrode whose density is high is more resistant to thermal shocks, its homogeneousness is better than that of high-porosity electrodes, and the electrode exhibits a much higher degree of elasticity. This is the reason that the makers of carbon electrodes subject such commodities to a secondary treatment which involves impregnation with pitch in autoclaves.

Heretofore known techniques involving pitch-impregnation of carbon electrodes include the insertion of carbon electrodes into a dryer and heating for a period of 2-6 hours to a temperature of approximately 200° C. with gas or oil burners. In the next step, the electrodes are transferred from the dryer into an autoclave by resorting to a crane (such as an overhead service crane), and the pressure in the autoclave is reduced below atmospheric pressure. This ensures expulsion or evacuation of gases from the pores of the electrodes. The next-following step involves the admission of pitch in such quantities that the electrode blanks are fully immersed in the filler. The pressure in the autoclave is thereupon raised by a pump or the like to 6-20 bars so that the pitch is caused to penetrate into the blanks and to fill the pores. The elevated pressure is maintained for a period of 1-2 hours. The surplus of admitted pitch is pumped out of the autoclave, and the electrodes are removed from the autoclave and inserted into cooling basins.

The just outlined conventional pitch-impregnating procedure exhibits a number of serious drawbacks. Thus, the malodorous fumes which develop during treatment of blanks contaminate the surrounding area, and the contaminants which are contained in such fumes are permitted to escape into the air or must be subjected to expensive secondary thermal combustion which consumes substantial amounts of energy. Alternatively, contaminated air must be caused to pass through complex and expensive electrofilters. The procedure is time-consuming and expensive on the additional ground that it involves a substantial amount of manual labor. Still further, the heating of carbon blocks is not uniform, and opening of the autoclave subsequent to evacuation of air and for the purpose of admitting pitch invariably results in penetration of substantial quantities of air into the pores of heated and vacuum-treated blanks. This prevents complete impregnation of the blanks so that the electrodes are of inferior quality or, at the very least, the quality of each and every portion of a finished electrode is not the same. The autoclave which is used for the practice of the aforedescribed process is bulky and the ratio of its capacity to the combined volume of blanks therein is highly unsatisfactory. This, too, contributes to higher cost of heretofore known premium grade electrodes.

OBJECTS AND SUMMARY OF THE INVENTION

An object of the invention is to provide a novel and improved method of impregnating carbon electrode blanks or like commodities in such a way that the procedure does not entail any, or any appreciable, contamination of the surrounding area.

Another object of the invention is to provide a simple and inexpensive method of producing premium grade carbon electrodes or analogous commodities.

A further object of the invention is to provide a novel and improved method of homogenizing and increasing the density of carbon electrodes.

An additional object of the invention is to provide a time-saving method of impregnating porous carbon blanks with pitch or analogous substances.

Still another object of the invention is to provide a novel and improved method of manipulating carbon blocks or blanks preparatory to, during and subsequent to impregnation with pitch, tar and/or analogous pore-filling substances.

A further object of the invention is to provide a novel and improved method of heating carbon blocks preparatory to conversion into premium grade electrodes.

Still another object of the invention is to provide a novel and improved apparatus for the practice of the above outlined method.

Another object of the invention is to provide the apparatus with novel and improved means for transporting carbon blocks or blanks preparatory to, during and subsequent to conversion into premium grade carbon electrodes.

An additional object of the invention is to provide a novel and improved apparatus for filling the pores of porous solid bodies with pitch or analogous filler materials.

Another object of the invention is to provide the apparatus with novel and improved means for heating carbon blocks preparatory to conversion into premium grade electrodes.

One feature of the invention resides in the provision of a method of impregnating porous solid bodies, particularly carbon blocks which are to be converted into premium grade carbon electrodes, with a flowable filler material, such as pitch or tar. The method comprises the steps of introducing solid porous bodies into sealable mobile vessels whose capacity preferably does not appreciably exceed the volumes of the introduced bodies (i.e., a vessel which has received a body is filled at least close to capacity), transporting or moving the vessels to each of a succession of stations, and subjecting the bodies in the vessels to at least one treatment at each of the stations including establishing communication (e.g., by means of conduits, nipples or the like) between the interiors of the vessels and the respective stations. The subjecting operation can include evacuating air and/or other gaseous fluids from the pores of the bodies at one of the stations, and forcing a flowable filler material at an elevated pressure into the thus evacuated or emptied pores at the same station or at another station. The solid porous body in at least one of the vessels may constitute a composite body consisting of several closely adjacent solid constituents. For example, each vessel can contain two, three or more cylindrical carbon blocks which are arrayed in such a way that the body which they together constitute fills the interior of the respective preferably cylindrical or tubular vessel as completely as possible in view of the configuration of the vessels and the configuration of the bodies therein.

In accordance with a presently preferred embodiment of the method, the first or foremost step of the subjecting operation includes heating the bodies in the vessels at the first one of the succession of stations, the next step involves introducing filler material into the pores of the heated bodies at another station, and an additional step involves baking the thus impregnated bodies at a further station. The baking can include combusting a fuel at the further station with attendant generation of hot combustion products, and the heating step then includes (or can include) establishing an exchange of heat between the thus generated hot combustion products and the bodies in the vessels at the first station. The just outlined embodiment of the method exhibits the advantage that the fuel which is supplied to the baking station is used with a very high degree of efficiency, i.e., first to bake the impregnated bodies and thereupon to effect initial heating of the bodies at the aforementioned first station.

Irrespective of the origin of hot combustion products or any other gaseous fluid which is used to heat the bodies at the first station, such heating can involve a multi-stage exchange of heat between the hot gaseous fluid and the bodies in several successive vessels in the following way: One stage of the heating step at the first station can include establishing a source of hot fluid (e.g., a reservoir for the aforediscussed hot combustion products) at the first station, contacting the body in each preceding vessel with the hot fluid which is drawn from or otherwise supplied by the source whereby the fluid is cooled as a result of exchange of heat with the body in the preceding vessel, and thereupon contacting the body in the next-following vessel with the thus cooled fluid so that the body in the next-following vessel is preheated prior to exchanging heat with the fluid which is drawn from or otherwise supplied directly by the aforementioned source. In other words, the body which has been preheated in response to direct or indirect contact with the cooled fluid is thereupon caused to exchange heat with a fluid whose temperature is higher than that of the already cooled fluid. The same procedure can be repeated in one or more additional stages, i.e., each body can be subjected to a gradual heating action in two, three or more stages until it reaches a temperature which is best suited for evacuation of air from its pores and for subsequent impregnation with a suitable filler material.

If desired or necessary, the hot fluid which is supplied by the source can receive controlled additional quantities of heat energy, e.g., by resorting to one or more auxiliary heaters which heat the fluid at the first station. For example, this might be desirable if the temperature of the aforediscussed combustion products (developing at the baking station) does not suffice to ensure adequate heating of bodies in the vessels which are transported or moved to the first station.

The vessels are airtightly sealed upon completion of the heating step and prior to start of the evacuating step of the aforementioned subjecting operation. The evacuating step is preferably followed by abrupt introduction of flowable filler material into the vessels (e.g., at the station at which the evacuation of air from the pores of the bodies takes place) and by raising the pressure in the interior of the vessels so that the introduced filler material is forced into the pores of the bodies therein. Penetration of filler material into the pores is enhanced by preceding evacuation of air and/or other fluids from the pores. The pressure in the vessels is preferably raised at a further station, i.e., at a station following the station for evacuation of fluids from the pores of bodies in the respective vessels. The interior of each vessel can be maintained at an elevated pressure for a period of 1-3 hours which ensures that at least the major part of introduced filler material penetrates into the pores of the bodies in the respective vessels. The non-penetrated (surplus) flowable filler material is thereupon extracted from the vessels, i.e., after a period of 1-3 hours of establishment of superatmospheric pressure in the sealed vessels.

The heating, air-evacuating and extracting steps of the subjecting operation normally involve withdrawal of gases and vapors from the respective vessels. Such gases are preferably contacted by a liquid medium, e.g., water. For example, the liquid medium can be circulated in a cooling tower during contact with the aforementioned gases and vapors. The gases can contain oxygen, nitrogen and/or others.

The aforediscussed baking step can include heating the bodies in the vessels to a temperature of at least 500° C. so that the filler material (such as pitch) in the pores of the bodies is carbonized.

The evacuation of surplus pitch and/or another filler material from the vessels subsequent to completion of the pressurizing operation can be immediately followed by admission of a gaseous or liquid coolant (e.g., water) into the vessels with attendant partial cooling of the impregnated bodies therein. The partially cooled bodies are thereupon removed from their vessels and can be introduced into a bath containing a liquid coolant to thus complete the cooling of the final products. Such contact between the bodies and the liquid coolant or coolants entails at least some contamination of the coolant or coolants, and the method can further comprise the step of filtering the coolant or coolants (e.g., in a coke filter) to segregate the contaminants therefrom. The thus intercepted contaminants (such as pitch) can be recycled, e.g., converted into coal.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
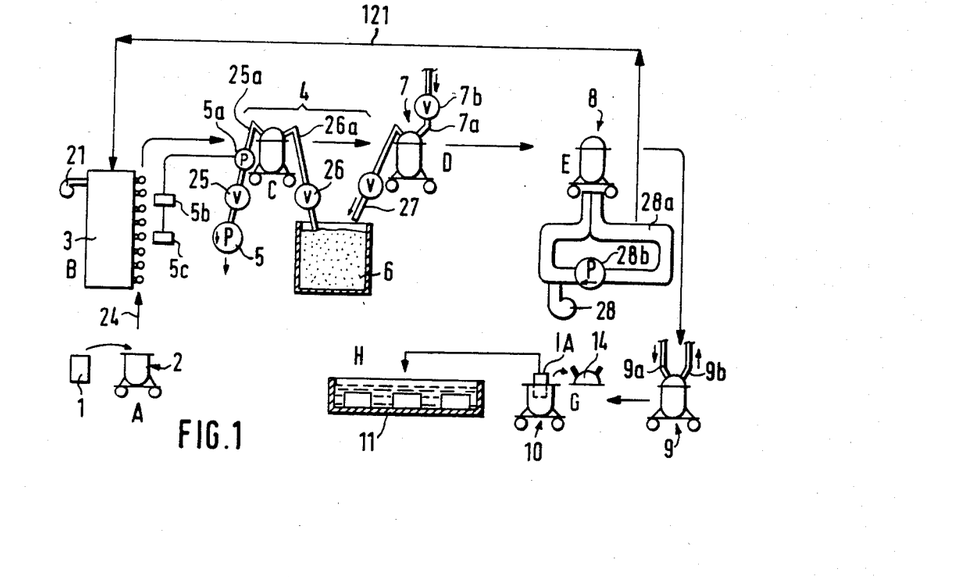
FIG. 1 is a diagrammatic view of an apparatus which embodies one form of the invention and wherein the vessels are transported to a baking station subsequent to extraction of surplus filler material and prior to cooling of the contents of the vessels.

FIG. 1 illustrates an apparatus which can be utilized for the practice of the novel method. The apparatus will be described with reference to the impregnation of bodies 1 which consist of porous carbon or graphite with the understanding, however, that the apparatus can be used with equal advantage for the impregnation of other types of porous solid bodies with pitch, tar and/or other flowable filler materials. At a station A, bodies 1 of coal are introduced into successive mobile receptacles or vessels 2 while the covers or lids 14 (see FIG. 2) of such vessels are removed. The means for introducing the bodies 1 into successive vessels 2 may comprise a customary service crane of the type used in steelmaking or analogous plants. The vessel 2 has wheels 12a (see FIG. 2) which are confined to travel along floor- or ground-mounted rails 13 (one shown in FIG. 2) so that each of a succession of freshly filled vessels 2 can be transported from the station A to the next station B where the contents of successive vessels are heated by a heating unit 3, for example, a heating unit of the type shown in greater detail in FIGS. 4 and 5 or in FIG. 6. The heating unit 3 is designed to effect an exchange of heat between the bodies 1 in the respective vessels 2 and a hot gaseous heating fluid, such as hot products of combustion which are generated at a further station (E) as a byproduct of baking of the filler material which has been introduced into the pores of the bodies 1. This entails surprisingly high savings in energy and equipment. The heating operation at the station B lasts 1–4 hours, depending on the dimensions of the bodies 1. An auxiliary burner 21 can be provided to effect controlled heating of the gaseous fluid which is used in the heating unit 3. For example, the unit 3 can be designed for the heating of bodies 1 in several successive stages in such a way that the highly preheated bodies 1 are contacted (directly or indirectly) by the hottest gaseous fluid, the less preheated bodies are caused to exchange heat with partially cooled gaseous fluid and the freshly delivered bodies 1 are contacted by the coolest (but still hot) gaseous fluid. The auxiliary burner or heater 21 can be used when the temperature of partially cooled gaseous fluid (such as the products of combustion supplied by conduit means 121 which receives products of combustion at the station E) does not suffice to effect adequate heating of bodies 1 during the corresponding stage of the heating step at the station B. The temperature of combustion products in the conduit means 121 can be as high as 700° C., and such temperature can drop to 200° C. during exchange of heat with bodies 1 at the station B. The auxiliary burner 21 not only ensures that each and every stage of heating of bodies 1 at the station B invariably entails a rise of temperature to a preselected value, but such burner (or burners) can also serve for the generation of additional hot gaseous fluid if the quantity of fluid which is supplied by the conduit means 121 does not suffice for a satisfactory heating within the allotted interval of time.

The vessels 2 at the station B are still open, i.e., the unit 3 can admit hot gaseous fluid through the open tops of such vessels so that the fluid comes into direct heat-exchanging contact with the bodies 1 which are moved, preferably stepwise, in the direction of arrow 24, namely, past the unit 3 and thereupon toward a third station C which accomodates a combined evacuating and impregnating unit 4. Once a vessel 2 advances past the heating unit 3, the corresponding cover or lid 14 is applied in such a way that the interior of the vessel (which contains a heated body 1) is sealed at the station B, at the station C or between the stations B and C.

Figure 2:
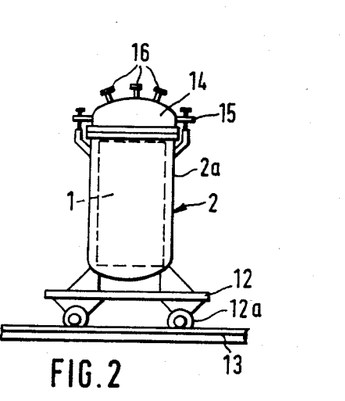
FIG. 2 is a side elevational view of a vessel which can be used in the apparatus of FIG. 1 and which is arranged to travel along and at a level above floor- or ground-mounted rails.

The unit 4 comprises a suction pump 5 which can be connected with the interior of a sealed vessel 2 at the station C by a conduit 25a and contains a suitable flow regulating and shutoff valve 25. The pump 5 serves as a means for evacuating air and/or other gaseous substances from the interior of the vessel 2, i.e., to evacuate gaseous substances from the pores of the heated body 1 in the vessel at the station C. As shown in FIG. 2, the lid 14 of each vessel 2 has three sealable nipples 16 or analogous connection means one of which can be coupled to the intake end of the conduit 25a prior to starting of the motor for the pump 5.

When the evacuation is completed, i.e., when the pressure in the interior of the sealed vessel 2 at the station C drops sufficiently below atmospheric pressure (the gauge or other means for indicating the pressure in the interior of a vessel at the station C is not specifically shown in the drawing), the valve 25 is closed and one of the nipples 16 at the station C is connected with the discharge end of a conduit 26a which contains a suitable valve 26 and whose intake end dips into a supply of flowable filler material (such as pitch), e.g., into a container 6 constituting a source of supply of such filler material. The filler material begins to flow from the source 6 into the vessel 2 at the station C as soon as the valve 26 is opened since the pressure in the interior of such vessel is below atmospheric pressure. However, it is equally within the purview of the invention to provide suitable means for enhancing the flow of filler material from the source 6 into successive vessels 2 at the station C. Since the quantities of filler material which are admitted into successive vessels 2 at the station C are relatively small (it will be recalled that the interior of each vessel is preferably nearly filled with the material of the respective body 1), the admission of filler material into such vessels takes place abruptly and is terminated within very short intervals of time, normally within a span of a few seconds. The filler material is preferably admitted in such quantities that it invariably fills the pores of the body 1 in the respective vessel 2 as well as that the vessels 2 can store a relatively small surplus of filler material which fills a portion of the space that is not taken up by the body 1. The subatmospheric pressure in the interior of a vessel 2 at the station C (immediately prior to admission of filler material from the source 6) can be in the range of 10 Torr. The pump 5 can be connected in series with a suitable steam ejector pump 5a which withdraws pitch vapors that develop on admission of pitch via conduit 26a. The vapors can be condensed and precipitated at 5b, e.g., by conveying them through a body of water or another liquid taken from the hydraulic system of the apparatus. The stream of liquid which issues from the precipitating unit 5b is caused to flow through a suitable filter, e.g., a coke filter 5c, so that it is relieved of contaminants prior to reintroduction into the hydraulic system.

Rapid filling of pores with filler material at the station C immediately after or during evacuation of air and vapors ensures that the pores cannot be refilled with air or another fluid medium prior to impregnation with pitch. In other words, all of the pores are or can be filled with pitch before the respective vessel 2 is transferred from the station C to the next station D which includes means 7 for raising the pressure in the vessel and for maintaining the elevated pressure for a requisite period of time, e.g., for a period of 1-3 hours. The means 7 comprises a pipe 7a containing a valve 7b and connected with a suitable source of pressurized fluid (such as air or nitrogen) which raises the pressure in the interior of the vessel 2 to a requisite value to thus ensure complete filling of pores with the filler material. When the required period of pressurization has elapsed, the surplus of filler material (if any) is expelled from the vessel 2 at the station D via conduit 27 containing a shutoff valve. The conduit 27 returns the surplus into the source 6 or into another container, not shown.

The apparatus of FIG. 1 further defines the aforementioned (optional) baking station E at which the contents of successively delivered vessels 2 are heated to a temperature of between 500° and 1000° C. in a heating unit 8 so as to ensure that the pitch filling the pores of the impregnated bodies 1 is carbonized, i.e, converted into coke. In other words, the filler material can be converted into carbon while the respective body 1 remains in its vessel 2. In accordance with heretofore known procedures, impregnated bodies are removed from stationary autoclaves, subjected to a cooling action and thereupon introduced into a specially designed baking furnace. The improved apparatus (wherein the baking takes place in the mobile vessels 2) renders it possible to achieve substantial savings in time, labor and energy as well as a substantial reduction of the danger of contamination of the surrounding atmosphere.

The means for heating the bodies in the vessels 2 at the station E can comprise one or more hot gas generators 28 which burn a suitable fuel and a system 28a with a pump 28 which circulates the hot gases so that they exchange heat with the bodies 1 in the vessels 2, either directly or by heating the vessels. The intake of the conduit means 121 communicates with the circulating system 28a. The arrangement is preferably such that the combustion products which are generated at 28 and are circulated by the pump 28b remove vapors and other flowable impurities from the vessels 2 at the station E, and such contaminated combustion products can be conveyed to the heating unit 3 to heat the bodies 1 in the vessels at the station B in stepwise fashion. Alternatively, the conduit means 121 can receive only products of combustion, i.e., products which do not come in direct contact with the contents of the vessels 2 at the station E.

A vessel 2 which is caused to leave the unit 8 at the baking station E advances to a first or preliminary cooling station F which includes means 9 for admitting into the vessels 2 a liquid coolant via conduit 9a and for evacuating the spent cooling fluid via conduit 9b. The conduits 9a and 9b can convey air, another gas or water.

The vessels 2 with partially cooled electrodes 1A therein are thereupon transported to a further station G where the covers 14 are removed by a device 10, such as a crane, and the electrodes 1A transferred into a station H containing a liquid bath 11 for final cooling of the electrodes 1A. The bath 11 is optional, i.e., it often suffices to cool the electrodes 1A only at the station F and to resort to the crane 10 at the station G solely for removal of the relatively heavy and bulky electrodes 1A from the respective vessels 2.

If the baking station E is omitted, the vessels 2 are transported from the station D directly to the station F or G, depending upon whether the electrodes 1A are to be cooled solely by the fluid which is admitted via conduit 9a or exclusively by the liquid in the bath 11 (which can accommodate two or more electrodes 1A). It is clear that the apparatus can retain the station F, G and H, even if the station E is omitted, depending upon the desired length of intervals which are to elapse during complete cooling of the electrodes 1A which are not subjected to a baking action.

The fluid which is evacuated via conduit 9b contains at least some contaminants, such as pitch vapors. Additional vapors normally develop during immersion of electrodes 1A into the bath 11. Pitch vapors issuing via conduit 9b are condensed by the cooling fluid which is admitted via conduit 9a and which also issues via conduit 9b. The stream of fluid issuing from the conduit 9a can be caused to pass through the coke filter 5c or through a separate coke filter which intercepts the contaminants and renders it possible to reuse the coolant. The coke in such filter absorbs at least the major percentage of contaminants, and the thus collected contaminants can be recycled, e.g., by converting the coke of the filter into bodies 1. The treatment of vapors which develop as a result of immersion of electrodes 1A into the bath 11 is preferably analogous, i.e., such vapors can be gathered (e.g., by a suitable hood above the bath 11) and directed through a coke filter which absorbs the contaminants and renders it possible to recycle the intercepted material to further enhance the economy of the operation.

It has been found that the bath 11 also contributes to a reduction of contamination of the surrounding area, especially if it is designed in such a way that one or more electrodes 1A can be fully immersed therein. This ensures rapid cooling and reduces the percentage of vapors which contain pitch vapors and/or other contaminants.

FIG. 2 shows the details of the mobile vessel 2 which constitutes an autoclave and includes a tubular section 2a for reception of a similarly configured body 1 of porous solid material. The section 2a is mounted on a carriage 12 with wheels 12a which are confined to travel along the floor- or ground-mounted rails 13 between the stations A and H shown in FIG. 1. The cover or lid 14 is connectable with the upper end portion of the section 2a by suitable locking means 15 such as screws, bolts, toggle clamps, knuckle joints or the like. The locking means 15 is preferably of the quick-release type.

The body 1 is inserted into the section 2a while the cover 14 is removed, for example, by an overhead crane or the like, not specifically shown. As mentioned above, the dimensions of the space within the confines of the section 2a should not appreciably exceed the dimensions of the body 1 so that the latter nearly fills the vessel 2 when the cover 14 is applied and locked to the section 2a. If the body 1 is a composite body consisting of several discrete constituents or blanks, the constituents are preferably grouped in such a way that they fill up a major portion of the space within the vessel 2.

The cover 14 is provided with the aforementioned nipples 16 or analogous connectors which facilitate the establishment of communication between the interior of the vessel 2 and the stations at which the bodies 1 are treated while the covers 14 are applied and locked to the sections 2a of the respective vessels 2. The number of nipples 16 can be reduced to two or one, or increased to four or more, depending on the desires of the manufacturer and on the number and nature of treatments to which the bodies 1 are subjected at the various stations. One of the nipples 16 can serve for admission or extraction of filler material, the other nipple can be connected with the conduit 25a at the station C, and the third nipple can be used for connection to the conduit 27 at the station D as well as for connection to the conduit 9a at the station F. If the cover 14 is provided with two nipples 16, such cover preferably carries suitable switchover valves to allow for rapid opening or closing of the respective passages at the various stations. A single nipple 16 will often suffice, e.g., when the stations E and F are omitted. The exact nature of the means for regulating the flow of various fluids through the nipple or nipples 16 forms no part of the invention. Commercially available valves can be used to open or seal the paths which are defined by such nipple or nipples.

Figure 3:
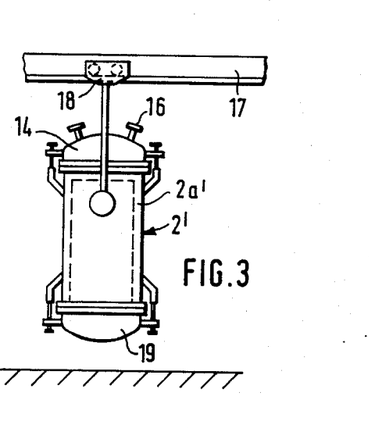
FIG. 3 is a similar elevational view of a modified vessel which is designed to travel along and below an overhead rail.

FIG. 3 shows a modified receptacle or vessel 2' whose tubular section 2a' is connectable with and separable from two covers or lids 14' and 19. The latter constitutes a separable bottom wall of the vessel 2' and need not be mounted on a carriage because the section 2a is suspended on a trolley 18 adapted to travel along an overhead monorail 17. The structure of FIG. 3 exhibits the advantage that the rail or rails do not take up any floor space at the steelmaking plant. While it is possible to provide one or more nipples on each of the covers or lids 14' and 19, FIG. 3 shows that the illustrated vessel 2' comprises several nipples 16' which are provided only on the top cover or lid 14'.

It is further within the purview of the invention to employ vessels whose sections are horizontal or inclined with reference to a horizontal plane as well as with reference to a vertical plane. Furthermore, the vessels 2 or 2' or analogous vessels can be mounted on conveyances other than the illustrated carriage 12 or trolley 18, e.g., on self-propelled vehicles such need not be mounted on rails so that they can be caused to advance the corresponding vessels to locations other than those defined by the rails 13 or overhead rail 17.

Figure 4:
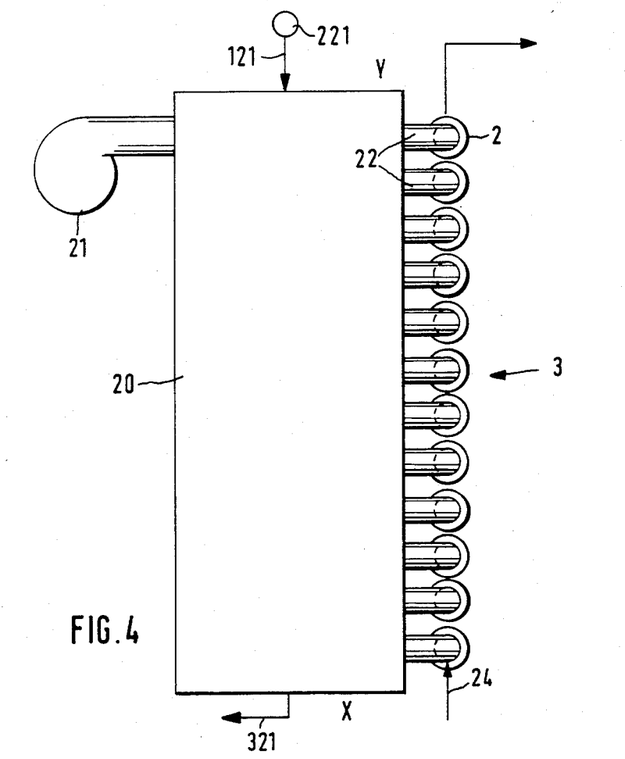
FIG. 4 is an enlarged plan view of a heating unit which can be utilized in the apparatus of FIG. 1.
Figure 5:
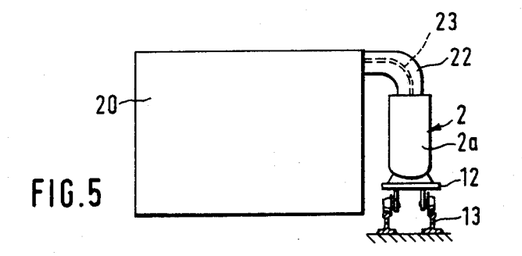
FIG. 5 is an end elevational view of the heating unit which is shown in FIG. 4.

FIGS. 4 and 5 show the heating unit 3 which can be used at the station B of FIG. 1. The main portion 20 of the heating unit 3 is an elongated box-shaped structure which constitutes a source of supply of hot combustion products supplied by the conduit means 121. In lieu of a connection with the circulating system 28a at the station E of FIG. 1, the main portion 20 can be connected with the outlets of one or more burners which supply hot combustion products or a hot gaseous fluid which is heated by combustion products. Such burner or burners can be provided in addition to or as a substitute for the auxiliary burner 121. The means for supplying hot combustion products via conduit means 121 can include the aforementioned pump 28b at the station E of FIG. 1 and/or additional circulating means (such as a fan 221) in the conduit means 121.

The main portion 20 of the heating unit 3 can have a length of at least 30 meters, a height of at least 5 meters and a width of at least 5 meters. One longer side of the portion 20 is provided with a row of spouts 22 which can be inserted into the open upper ends of sections 2a of a battery of vessels 2 at the station B. The diameters of the substantially L-shaped spouts 22 preferably approximate the inner diameters of the upper end portions of sections 2a so that the admission of heating gases can take place with minimal losses in heat energy. As shown in FIG. 5, each spout 22 can have an internal partition 23 (indicated by a broken line) so that the interior of the spout defines two passages, one for admission of hot or relatively hot gases into the interior of the respective vessel 2 and the other for withdrawal of spent (cooled) gases from the interior of the respective vessel. The spent gases are then admitted into the spout 22 which is connected with the next-following vessel 2 and so forth so that the foremost body 1 (i.e., the body in the uppermost vessel 2, as viewed in FIG. 4) is contacted by the hottest gases and the rearmost body 1 (in the lowermost vessel 2 of FIG. 4) is contacted by repeatedly cooled gases. In other words, the bodies 1 are subjected to a multi-stage heating action of one and the same gaseous fluid which is gradually cooled as a result of contact with progressively cooler bodies 1. As mentioned above, the temperature of gases which are used at the station B can decrease from 700° to 200° C.

The vessels 2 can be advanced stepwise from the front end X toward the rear end Y of the main portion 20 of the heating unit 3. Alternatively, the vessels 2 can be moved stepwise in groups of two, three or more counter to the direction of transport of gaseous heating fluid. Such fluid flows from the rear end Y toward the front end X to issue at 321 and to be passed through a body of liquid or through a filter in order to be relieved of contaminants which should not be permitted to enter the surrounding atmosphere. If the vessels 2 are advanced in groups of two or more, the spouts 22 are also assembled into groups each of which receives a gaseous heating fluid at the same temperature. The arrow 24 indicates the direction of stepwise travel of vessels 2 along the main portion 20 of the heating unit 3. The compartments, baffles, pipes and analogous devices which regulate the flow of heating fluid in the interior of the main portion 20 are not specifically shown in the drawing. All that counts is to ensure that the unit 3 can heat the bodies 1 in several stages and to a desired temperature, either in response to repeated movements of vessels 2 by steps of unit length (corresponding to the distance between the axes of two neighboring sections 2a) or by steps of multiple unit length (if the vessels 2 are grouped for simultaneous advancement of two or more neighboring vessels 2 in the direction of arrow 24).

It is also within the purview of the invention to provide the interior of the main portion 20 with suitable flaps which can be moved to several positions in order to convert the heating unit 3 from stepwise heating of blocks in several stages whose number equals the number of spouts 22 to stepwise heating in fewer stages whose number is a fraction of the total number of spouts. If the heating unit 3 is equipped with its own burner or burners (in addition to or in lieu of the auxiliary burner 21), such burner or burners are preferably arrested during the intervals of transport of bodies 1 in the direction of arrow 24. This results in additional savings in energy, i.e., in savings which are compounded by those achieved as a result of stepwise or stagewise heating of bodies 1, preferably by hot combustion products which are the byproduct of treatment of bodies 1 at another station (E in FIG. 1).

Figure 6:
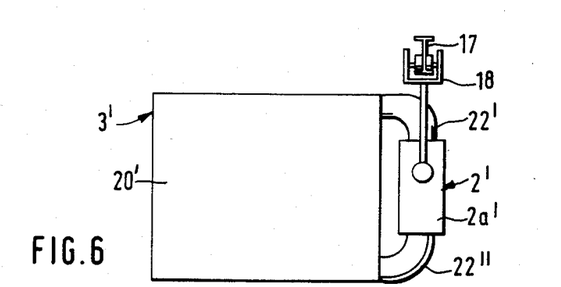
FIG. 6 is an end elevational view of a modified heating unit.

FIG. 6 shows the main portion 20 of a modified heating unit 3'. The portion 20 is provided with a battery of first spouts 22' which admit hot gases into the respective sections 2a' of vessels 2' of the type shown in FIG. 3, and second spouts 22" which receive partially or fully spent gases from the lower end portions of the sections 2a'. Thus, the spouts 22' deliver hot gases from above and the spouts 22' receive cooler gases from the lower ends of the sections 2a'. The manner in which the bodies 1 are held in the interior of a section 2' which is detached from the cover 14' as well as from the cover 19 is not specifically shown in FIG. 6. To this end, each section 2a' can have an apertured grate which is adjacent to its lower end and on which an inserted body 1 comes to rest so that it can exchange heat with hot gases supplied by the spout 22' while the spout 22" can gather cooled gases which flow along the body 1 in the section 2a'. An advantage of the heating unit 3' is that each body 1 can be even more rapidly heated to a desired temperature because each spout 22' can serve solely for admission of hot gases, i.e., there is no need for partitions 23 because the spent or cooled gases are removed via spouts 22".

It is further within the purview of the invention to replace the heating unit 3 or 3' with a heating unit wherein an entire battery of bodies 1 can be heated without moving the respective vessels 2 or 2' relative to the heating unit. In other words, each of the sections 2' or 2a' remains connected to one and the same spout 22 or to one and the same pair of spouts 22', 22" during the entire interval of heating the respective body 1 to a desired temperature. The vessels 2 and 2' are then equipped with suitable temperature monitoring means which transmit signals to control elements or to a computer serving to regulate the rate and/or the temperature of gaseous fluid flowing into the sections 2a or 2a' so as to effect a stepwise or continuous heating of bodies 1 to a desired temperature. The just discussed mode of heating is especially desirable and advantageous when the dimensions of the bodies 1 are not uniform, i.e., when it is necessary to supply larger quantities of heat energy to one or more vessels 2 or 2' and smaller quantities of heat energy to the remaining vessel or vessels. The heating of certain bodies then takes longer at a first set of locations along the heating unit but can be completed within shorter intervals of time at the remaining locations. Alternatively, the heating action can be slowed down at locations occupied by vessels containing bodies 1 which require relatively small amounts of heat energy for heating to a preselected temperature. The basic mode of heating is preferably the same as described above, i.e., each body 1 is first contacted by relatively cool or by cooled heating fluid, thereupon by a warmer heating fluid and so on so that the last stage of heating involves contact with the hottest fluid. Such heating technique entails very substantial savings in heat energy, especially if the heating fluid is the byproduct of treatment at another station.

The station C, D, E, F or G can be large enough to simultaneously receive two or more vessels 2 or 2', for example, to receive groups of vessels corresponding to those which are moved stepwise along the station B. A vessel 2 or 2' at the station C is sealed before a nipple 16 or 16' is connected with the conduit 25a and the valve 25 is opened to enable the pump 5 to reduce the pressure in the interior of the vessel to a value at which the pores of the body 1 are devoid of any gases or vapors and are ready to be filled with pitch or the like. The valve 26 in the conduit 26a (which is connected with another nipple 16 or 16' of the vessel 2 or 2' at the station C) is opened on closing of the valve 25 so that the conduit 26a abruptly admits a requisite amount of filler material from the source 6. It is preferred to admit filler material in such quantities that the body 1 in the vessel 2 or 2' is completely immersed in the admitted material. Once a thus filled vessel 2 or 2' is transferred to the station D and the conduit 7a is connected with a nipple 16 or 16', the pressure in the vessel is caused to rise to between 6 and 20 bars with the result that the filler material is forced to penetrate into the pores of the body 1. As mentioned above, the pressure is maintained for a period of 1–3 hours before the valve in the conduit 27 is opened to permit return flow of surplus filler material into the source 6. The extraction of surplus filler material from the vessel 2 or 2' at the station D can be assisted by a pump in the conduit 27.

If the apparatus includes the station E of FIG. 1, the bodies 1 in the vessels 2 or 2' at such station can be heated, directly or indirectly, to a temperature at which the filler material is converted into coke.

The conduit 9a at the station F can admit cold air, water or a neutral gas, such as nitrogen. Partial or initial cooling at the station F is followed by the transfer of vessels 2 or 2' to the station G where the covers 14 or 14' are removed so that the crane can transfer the partially cooled electrodes 1A into the bath 11.

Figure 7:
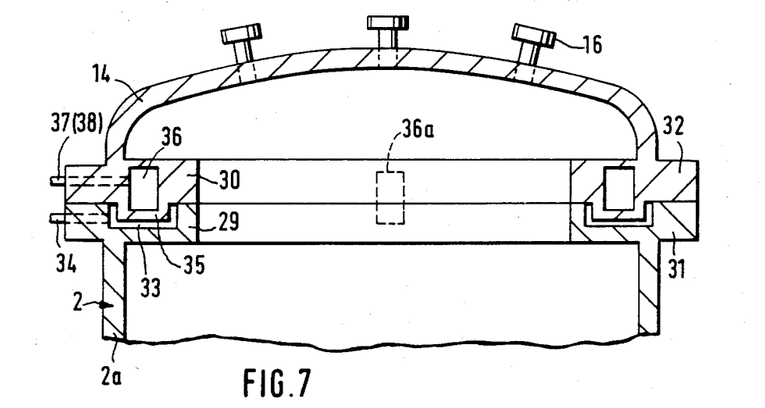
FIG. 7 is an enlarged fragmentary central vertical sectional view of the upper portion of the vessel which is shown in FIG. 2 or 3.

It will be appreciated that satisfactory sealing of the vessels 2 or 2' subsequent to heating of the bodies at the station B and during treatment at the stations C, D is highly important and desirable. In accordance with a presently preferred embodiment, the sealing action is enhanced by the filler material (normally pitch) in a manner as shown in FIG. 7. The vessel 2 which is shown in FIG. 7 has an upright cylindrical section 2a whose upper end portion is provided with an annular flange or collar 29 whose upper side has an annular groove 33. The marginal portion of the cover 14 has a similar collar or flange 30 whose underside is formed with an annular protuberance or rib 35 extending, with clearance, into the groove 33 when the cover 14 is properly applied to the section 2a. The groove 33 and the rib 35 are provided in those portions of the flanges which extend inwardly of the cylindrical part of the section 2a. The outer portions 31 and 32 of the flanges 29, 30 extend radially outwardly beyond the cylindrical part of the section 2a and are secured to each other by screws, toggles or analogous mechanical locking means (not shown in FIG. 7 but corresponding to the locking means 15 of FIG. 2).

The groove 33 can receive pitch by way of a pipe 34 which extends through the outer portion 31 of the flange 29 and is connectable with the source 6 or another suitable source of pitch. The rib 35 is formed with an annular conditioning chamber 36 which communicates with alternating coolant-supplying pipes 37 and coolant-evacuating pipes 38 (only one pipe 37 and only one pipe 38 are shown in FIG. 7). Such pipes are distributed around the circumference of the cover 14. The chamber 36 is divided into several compartments by radial partitions 36a one of which is indicated by broken lines. The partitions 36a are disposed between the discharge end of each pipe 37 and the intake end of a neighboring pipe 38 so that they act not unlike flow restrictors to retard the flow of admitted coolant into the corresponding pipes 38.

When the cover 14 is placed onto and locked to the section 2a, the pipe 34 admits pitch into the groove 33 at a pressure which suffices to ensure that the groove portion which is not filled by the rib 35 is completely filled by the inflowing filler material. At the same time, the pipes 37 admit a cooling fluid which causes solidification of pitch in the groove 33 whereby the solidified material contacts the flanges 29 and 30 and thus constitutes a reliable fluidtight seal between the interior of the vessel 2 and the surrounding atmosphere. If the cover 14 is to be removed (such as at the station G of FIG. 1), the pipe 37 admits a heated fluid so that the solidified pitch in the groove 33 reassumes a pasty or viscous consistency and permits removal of the cover 14 upon disengagement of the mechanical locking means 15.

It is clear that an arrangement similar to that shown in FIG. 7 will be provided at both ends of the section 2a' of a vessel 2' to ensure the establishment of fluidtight seals between the section 2a' on the one hand and the covers 14', 19 on the other hand.

The arrangement of FIG. 7 is especially desirable when the improved apparatus is used for the making of carbon electrodes because pitch furnishes a satisfactory sealing action even if the vessel 2 or 2' is heated to a very high temperature at which many other thermoplastic materials (such as various synthetic plastic substances) would undergo immediate combustion. The same applies for elastic seals which are often used for fluidtight sealing of containers at normal or slightly above normal temperatures.

Figure 8:
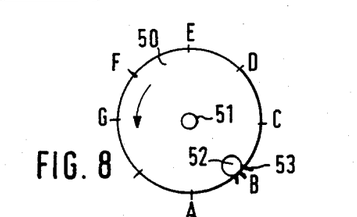
FIG. 8 is a schematic plan view of a modified apparatus.

FIG. 8 shows a modified apparatus wherein a rotary turntable or platform 50 is driven by a shaft 51 and carries an annulus of vessels 52 adjacent to its peripheral surface. The turntable 50 can be indexed to move the vessels 52 seriatim to successive stations A, B, C, D, E, F and G. The nipples 53 of the vessel 52 extend radially outwardly beyond the peripheral surface of the turntable 50 so that they can be readily connected to various instrumentalities at the adjacent stations. The vessels 52 can be assembled into groups or clusters of two or more, and such clusters then form an annulus at the periphery of the turntable 50.

An important advantage of the improved method and apparatus is that the contamination of the surrounding atmosphere is reduced to a fraction of that which is unavoidable when bodies of porous carbon or graphite are impregnated in accordance with heretofore known proposals. Impregnation of carbon bodies with pitch in accordance with prior proposals invariably entails the generation of large quantities of malodorous fumes which must be treated at a high cost prior to discharge into the atmosphere.

Another important advantage of the improved method and apparatus is that the impregnating operation can be carried out with surprisingly high savings in energy, labor, space and equipment.

A further important advantage of the improved method and apparatus is that the heating of porous bodies, evacuation of fluids from their pores and impregnation are much more uniform than by resort to heretofore known methods and apparatus so that the current-carrying and other properties (such as elasticity) of electrodes 1A are superior to those of presently available electrodes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptions should and are intended to be comprehended within the meaning and range of equivalence of the appended claims.

I claim:

1. A method of impregnating porous solid bodies comprising the steps of:
   (a) introducing a porous solid body into a sealable mobile vessel;
   (b) heating the body at a heating station while the body is in the vessel;
   (c) transporting the vessel with the heated body therein to a contacting station;
   (d) contacting the body in the vessel with a flowable filler material at said contacting station for impregnation of the body;
   (e) sealing the interior of the vessel from the atmosphere subsequent to said introducing step and prior to said contacting step, said contacting step including establishing communication between the interior of the vessel and a source of the flowable filler material while maintaining the vessel otherwise sealed;
   (f) transporting the sealed vessel with the body therein from said contacting station to a cooling station;
   (g) cooling the body in the vessel with a cooling medium at said cooling station, said cooling step including establishing communication between the interior of the vessel and a cooling system while maintaining the vessel otherwise sealed; and
   (h) removing the body from the vessel subsequent to said cooling step.

2. The method of claim 1, wherein the solid porous body is a composite body consisting of several closely adjacent solid porous constituents.

3. The method of claim 1, comprising the step of evacuating air from the pores of the body subsequent to said sealing step and prior to said contacting step.

4. The method of claim 3, wherein said evacuating step is performed at said contacting station.

5. The method of claim 1, comprising the step of elevating the pressure in the interior of the vessel subsequent to said contacting step and prior to said cooling step to thereby force the flowable filler material into the pores of the body, said elevating step including establishing communication between the interior of the vessel and a source of a pressurizing medium while maintaining the vessel otherwise sealed.

6. The method of claim 5, said elevating step being performed at a pressurizing station; and wherein said step of transporting the sealed vessel from said contacting station to said cooling station comprises conveying the sealed vessel to said pressurizing station.

7. The method of claim 1, comprising the step of baking the body in the vessel subsequent to said contacting step and prior to said cooling step while maintaining the vessel sealed other than from a heating system.

8. The method of claim 7, said baking step being performed at a baking station; and wherein said step of transporting the sealed vessel from said contacting station to said cooling station comprises conveying the sealed vessel to said baking station.

9. The method of claim 1, wherein said steps are performed for a plurality of porous solid bodies using a plurality of sealable mobile vessels.

10. The method of claim 1, comprising the step of extracting excess filler material from the vessel subsequent to said contacting step and prior to said cooling step while maintaining the vessel sealed other than from a receptacle for the filler material.

11. The method of claim 10, said extracting step being performed at a pressurizing station; and wherein said step of transporting the sealed vessel from said contacting station to said cooling station comprises conveying the sealed vessel to said pressurizing station.

12. The method of claim 1, comprising the step of immersing the body in a liquid coolant bath subsequent to said removing step so as to complete the cooling thereof.

13. The method of claim 12, wherein said cooling step is performed using a liquid coolant.

14. The method of claim 1, wherein said introducing step is performed in such a manner that the capacity of the vessel does not appreciably exceed the volume of the body.

15. The method of claim 1, wherein said heating step is performed prior to said sealing step.

16. The method of claim 1, wherein said heating step is performed for a period of about 1-4 hours.

17. The method of claim 15, wherein said fluid medium comprises water.

18. The method of claim 7, wherein said baking step includes combusting a fuel with attendant generation of hot combustion products and said heating step includes establishing an exchange of heat between the hot combustion products and another body at said heating station.

19. The method of claim 9, wherein said heating step includes establishing a multi-stage exchange of heat between a hot gaseous fluid and the bodies in several successive vessels at said heating station, comprising establishing a source of hot fluid, contacting the body in each preceding vessel with such hot fluid whereby the fluid is cooled as a result of exchange of heat with the body in the preceding vessel, and thereupon contacting the body in the next-following vessel with the thus-cooled fluid so that the body in the next-following vessel is preheated prior to contact with the hot fluid.

20. The method of claim 7, wherein said baking step includes combusting fuel with attendant generation of hot combustion products, said heating step including establishing an exchange of heat between the hot combustion products and another body at said heating station and supplying controlled quantities of heat energy to the combustion products at said heating station.

21. The method of claim 3, wherein said contacting step comprises abruptly introducing the flowable filler material into the pores of the body.

22. The method of claim 5, wherein said elevating step includes maintaining the interior of the vessel at superatmospheric pressure for a predetermined period so that at least the major part of the introduced flowable filler material penetrates into the pores of the body.

23. The method of claim 22, comprising the step of extracting the non-penetrated flowable filler material from the vessel after elapse of said period.

24. The method of claim 23, wherein said heating, air evacuating and extracting steps involve withdrawal of gases from the vessel and further comprising the step of contacting such gases with a liquid medium.

25. The method of claim 24, wherein said liquid medium is water.

26. The method of claim 24, wherein said gas contacting step includes contacting the gases with a circulating fluid in a cooling tower.

27. The method of claim 26, wherein said gases contain oxygen.

28. The method of claim 26, wherein said gases contain nitrogen.

29. The method of claim 7, wherein said baking step comprises heating the body to a temperature of at least 500° C. so as to carbonize the filler material which has penetrated into the pores of the body.

30. The method of claim 29, wherein said filler material consists of or contains pitch.

31. The method of claim 13, further comprising the step of filtering the liquid coolant to segregate the contaminants therefrom.

32. The method of claim 31, wherein said filtering step comprises contacting the contaminated liquid coolant with coke.

33. The method of claim 31, further comprising the step of recycling the intercepted contaminants.

34. The method of claim 33, wherein said contaminants include pitch and said recycling step comprises converting such pitch into coal.

35. The method of claim 1, wherein the flowable filler material comprises pitch.

36. The method of claim 35, wherein pitch vapors are generated; and further comprising the steps of entrapping the pitch vapors in a fluid medium, and condensing the pitch vapors to permit recovery of the same.

37. The method of claim 3, wherein, said evacuating step is performed by reducing the pressure in the vessel to the range of 10 torr.

38. The method of claim 5, wherein said elevating step comprises forcing the flowable filler material into the pores of the body by raising the pressure in the vessel to a value between about 6 and 20 bars.

39. The method of claim 5, wherein said elevating step comprises forcing the flowable filler material into the pores of the body by maintaining a superatmospheric pressure in the vessel for a period of about 1-3 hours.

40. The method of claim 7, wherein the flowable filler material is carbonaceous and said baking step comprises baking the body so as to carbonize filler material in the pores of the body, said baking step being performed at a temperature between about 500° and 1000° C.

41. The method of claim 9, wherein the bodies comprise carbon blocks and the carbon blocks are converted into premium grade carbon electrodes.

* * * * *